UNITED STATES PATENT OFFICE.

ANDREW NORTON COLE, OF BROCKVILLE, CANADA, ASSIGNOR TO HIMSELF AND HERBERT C. JONES, OF SAME PLACE.

IMPROVEMENT IN SEPARATING OIL FROM COTTON-WASTE.

Specification forming part of Letters Patent No. 115,708, dated June 6, 1871.

I, ANDREW NORTON COLE, of the town of Brockville, in the county of Leeds, in the Province of Ontario and Dominion of Canada, have invented a certain Process for Extracting or Separating Saturated Oil from Cotton-Waste or refuse cotton, and restoring its absorbent quality, of which the following is a specification:

The oil-saturated cotton-waste or refuse cotton to be renovated is immersed in a tank containing a solution made of fifty gallons of soft water, two ounces of chlorine or chloride of lime, one ounce of spirits of turpentine, two ounces of borax, and one ounce of ammonia; or more or less of these several ingredients may be added to bring the solution to a strength of about one degree by hydrometer, or of a greater or lesser strength, not, however, sufficient to "cut" the oil, and which solution will be sufficient in quantity to treat about one hundred pounds of saturated cotton-waste or refuse cotton.

The solution is heated in a suitable tank or apparatus to the boiling-point, and the oleaginous waste agitated therein for a few minutes; it is then passed between compression-rollers placed above the tank to squeeze out the solution and oil, which again returns to the tank. The waste or cotton thus treated is then passed to a second tank, containing a solution of caustic soda, soda-ash, or any of the alkalies dissolved in water to 7° in strength by hydrometer, and when brought to the boiling-point two ounces of chlorine or chloride of lime are added thereto. After the cotton-waste has been immersed in this second solution it is again passed through another set of compression-rollers in the manner before described, the solution and remaining oleaginous matter returning again to the second tank. The waste is then passed to a third tank, where it is treated with boiling water and again passed through a third set of compression-rollers. In this state it is laid on frames, and when dry is beaten with a flail on a wire or perforated bed, to open and separate the fibers. It is then ready for use.

The oil or oleaginous matter extracted or separated from the cotton or refuse waste will be found floating on the surface of the solutions in the first and second tanks, and may be removed by skimming or other means, and, after purification, be again fit for lubricating or other purposes.

I do not claim the apparatus, or any improvement thereon, or any specific method of purifying the extracted or separated oil.

What I claim as my invention is—

Treating the oil-saturated waste or refuse cotton with the chemical solutions prepared as described, in the manner and for the purposes set forth.

ANDREW NORTON COLE.

Witnesses:
HENRY GRIST,
JOHN GRIST, Junr.